United States Patent [19]

Bradford et al.

[11] 4,243,637

[45] * Jan. 6, 1981

[54] URANIUM RECOVERY FROM PRE-TREATED PHOSPHORIC ACID

[75] Inventors: James L. Bradford, Brea; Fernando Ore, Whittier, both of Calif.

[73] Assignee: Occidental Petroleum Company, Los Angeles, Calif.

[*] Notice: The portion of the term of this patent subsequent to Oct. 11, 1994, has been disclaimed.

[21] Appl. No.: 840,791

[22] Filed: Oct. 11, 1977

Related U.S. Application Data

[63] Continuation-in-part of Ser. No. 688,265, May 20, 1976, Pat. No. 4,053,564.

[51] Int. Cl.² .................... C01G 43/00; C01G 43/02
[52] U.S. Cl. ........................................ 423/10; 423/8
[58] Field of Search ................................ 423/8, 10

[56] References Cited

U.S. PATENT DOCUMENTS

| | | | |
|---|---|---|---|
| 3,711,591 | 1/1973 | Hurst et al. | 423/10 |
| 3,737,513 | 6/1973 | Wiewiorowski et al. | 423/8 |
| 3,835,214 | 9/1974 | Hurst et al. | 423/10 |
| 3,966,873 | 6/1976 | Elikan et al. | 423/8 |
| 4,002,716 | 1/1977 | Sundar | 423/8 |
| 4,053,564 | 10/1977 | Bradford et al. | 423/321 S |

*Primary Examiner*—Edward A. Miller
*Attorney, Agent, or Firm*—Barry A. Bisson

[57] ABSTRACT

Impure phosphoric acid containing uranium values is pretreated with a water immiscible organic sulfonic acid, preferably in conjunction with a water immiscible organic acid phosphate compound, for extraction of ionic metallic impurities and organic impurities to produce pretreated phosphoric acid containing uranium values. Pretreated phosphoric acid is contacted with a water immiscible extractant comprising an organic uranium-extracting agent, preferably an organophosphorus compound, dissolved in a water immiscible organic diluent to produce uranium-depleted phosphoric acid and uranium-enriched extractant. Uranium is recovered from the uranium-enriched extractant.

16 Claims, 3 Drawing Figures

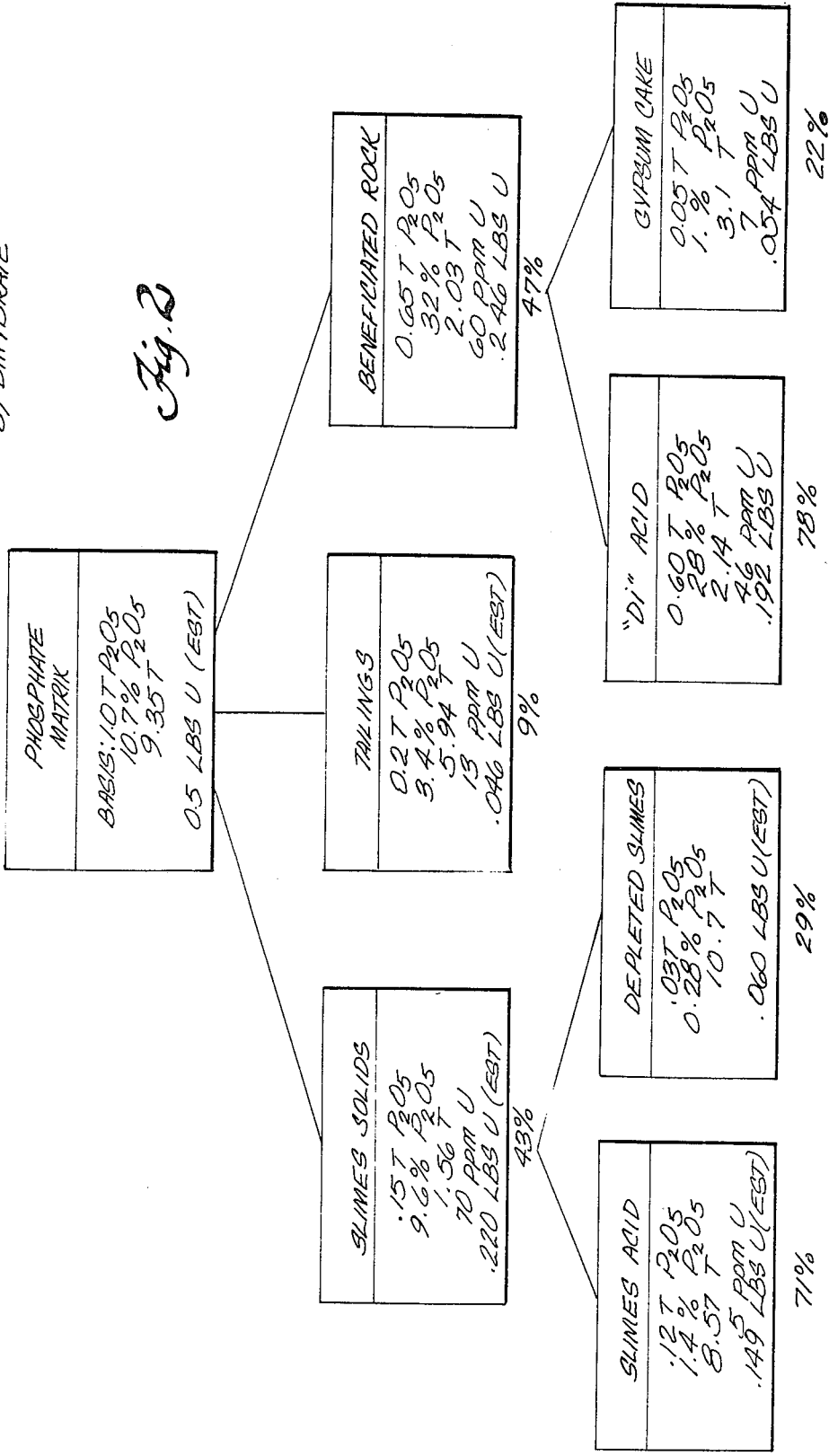

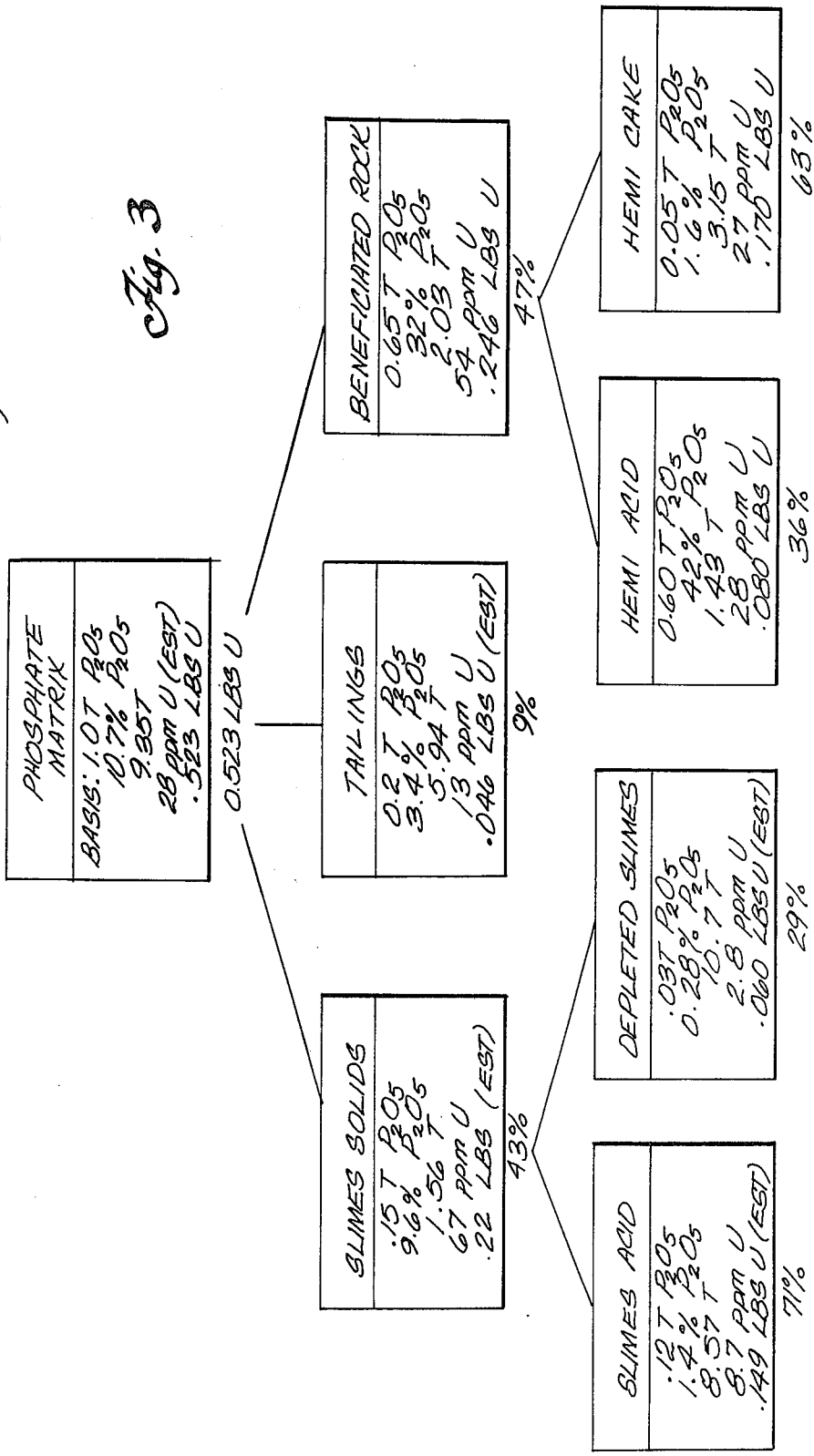

URANIUM RECOVERY FROM PRE-TREATED PHOSPHORIC ACID

CROSS-REFERENCE TO RELATED APPLICATION

This application is a Continuation-In-Part of U.S. patent application Ser. No. 688,265, filed May 20, 1976, now U.S. Pat. No. 4,053,564.

BACKGROUND OF THE INVENTION

The present invention is directed to a process for the recovery of uranium from phosphoric acid. A solvent extraction process is employed to remove ionic metallic impurities, such as $Ca^{+2}$, $Mg^{+2}$, $Al^{+3}$, and $Fe^{+2,+3}$, and organic impurities from unpurified phosphoric acid containing uranium, preferably unpurified wet process phosphoric acid prepared by the dihydrate, the hemihydrate or the anhydrite process. The thus pretreated phosphoric acid contains uranium values. Uranium is recovered from pretreated phosphoric acid by means of another solvent extraction process. The uranium-depleted phosphoric acid can then be employed in the production of high quality superphosphoric acid (SPA).

Phosphoric acid containing uranium values is produced in the treatment of phosphate rock found in Florida and other parts of the United States and in several foreign countries. Phosphate rock is mined principally for conversion to superphosphoric acid (SPA) and thereafter to high phosphate fertilizer products. Mined phosphate rock is digested with sulfuric acid to produce a phosphoric acid solution (wet process phosphoric acid) and insoluble calcium sulfate (gypsum). The phosphoric acid solution is further processed to produce fertilizer products.

Phosphate rock mined in Florida contains uranium in low concentrations, about 0.01 to 0.02 weight percent in rock from central Florida, and somewhat less in rock from northern Florida. Although the concentration is low, great quantities of phosphate rock are converted to phosphoric acid each year. Wet process phosphoric acid having a $P_2O_5$ content of 28 weight percent can have as much as 60 to 150 or more milligrams of uranium per liter. Such acid is a significant potential source of uranium. An economical process for recovery of uranium from such acid before it is converted to fertilizer and dispersed across the earth would be highly desirable.

A number of solvent extraction processes for recovery of uranium from wet process phosphoric acid have been described.

U.S. Pat. No. 2,835,552, the entire disclosure of which is incorporated herein by this reference, describes the extraction of uranium in reduced form with a phosphoric acid ester organic solvent, such as mono and diesters of orthophosphoric and pyrophosphoric acids and octyl alcohol dissolved in kerosene. Uranium is recovered as a solid tetrafluoride precipitate by extraction from the organic solvent with a solution of phosphoric acid and hydrofluoric acid.

U.S. Pat. No. 3,711,591, the entire disclosure of which is incorporated herein by this reference, describes solvent extraction of uranium in oxidized form with di(2-ethylhexyl) phosphoric acid (D2EHPA) and trioctylphosphine oxide (TOPO) dissolved in an organic diluent followed by reductive stripping of the uranium. The uranium is reoxidized in the stripping solution and then extracted therefrom with a second extraction solvent comprising D2EHPA and TOPO. Uranium is recovered from second extraction solvent as ammonium uranyl tricarbonate (AUT) by stripping with ammonium carbonate solution. The AUT is then calcined to $U_3O_8$. The reoxidation and second extraction help to overcome problems of phase separation and hindered precipitation of uranium associated with humic acids coextracted from the phosphoric acid by the organic extractant.

U.S. Pat. No. 3,737,513, the entire disclosure of which is incorporated herein by this reference, describes solvent extraction of uranium from phosphoric acid with a dialkylphosphoric acid and a trialkylphosphine oxide dissolved in a water immiscible organic solvent. Uranium is reductively stripped from the organic extractant with an aqueous phosphoric acid or hydrofluoric acid solution containing ferrous ion.

U.S. Pat. No. 3,835,214, the entire disclosure of which is incorporated herein by this reference, describes the recovery of uranium from wet process phosphoric acid. Uranium in the phosphoric acid is reduced to the uranous form by contacting the acid with elemental iron. Reduced uranium is extracted with an organic extractant solution containing mono- and di-alkylphenyl esters of orthophosphoric acid, including octylphenyl esters, dissolved in an inert diluent such as kerosene. Uranium is oxidatively stripped from the organic extractant with an aqueous stripping solution containing phosphoric acid and an oxidant such as sodium chlorate. Oxidized uranium is extracted from the stripping solution with a second organic extractant comprising di(2-ethylhexyl) phosphoric acid and trioctylphosphine oxide dissolved in an inert organic diluent. The second organic extractant is scrubbed with water to remove phosphoric acid and is then stripped with an ammonium carbonate solution to form a solution or slurry of ammonium uranyl tricarbonate. The ammonium uranyl tricarbonate is calcined to $U_3O_8$.

As is shown in the art, superphosphoric acid (SPA) is produced by conventional techniques of evaporation and/or dehydration of phosphoric acid. The $P_2O_5$ content of the SPA so produced is from a minimum of about 65% $P_2O_5$ to values over 100% $P_2O_5$.

If unpurified phosphoric acid is used in the SPA process, SPA possessing a high viscosity is usually produced. On aging, a plastic-or-glass-like material results which is extremely difficult to handle. On the other hand, SPA produced from purified phosphoric acid does not exhibit these deleterious properties. Therefore, a number of processes have been described for the purification of phosphoric acid before conversion to superphosphoric acid.

One approach has been to selectively extract phosphoric acid from impure phosphoric acid, leaving behind a phosphoric acid solution having a higher concentration of the impurities. U.S. Pat. Nos. 3,367,749, 3,903,247, and 3,970,741 which are incorporated herein by reference, are exemplary. A disadvantage of this approach is that an even more impure phosphoric acid solution which contains uranium values is produced as a byproduct, and uranium must then be recovered from the very impure byproduct acid. Such impure byproduct acid can be treated for uranium recovery in accordance with practice of this invention.

Another approach for removing ionic metallic impurities has been to seed a concentrated wet process phosphoric acid solution to induce precipitation of ionic metallic impurities as insoluble salts and then to remove the precipitates by secondary filtration. Such processes are described in U.S. patent application Ser. No. 810,484, filed June 27, 1977, by Harold E. Mills, and titled "Metallic Ion Removal From Phosphoric Acid", and assigned to Occidental Chemical Co. now U.S. Pat. No. 4,136,199 The entire disclosure of said Application Ser. No. 810,484 is incorporated herein by this reference. Phosphoric acids treated by secondary filtration can be extracted to recover uranium by the process of the present invention.

It has also been recognized that it can be beneficial to purify wet process phosphoric acid before the acid is used as feed to a uranium solvent extraction process. In *Recovery of Uranium From Wet-Process Phosphoric Acid by Extraction with Octylphenylphosphoric Acid* by F. J. Hurst and D. J. Crouse, Ind. Eng. Chem. Process Des Develop., Vol 13, No. 3, pp 286–291 (1974), it is disclosed that organic matter present in phosphate rock and wet process phosphoric acid made therefrom can interfere with uranium recovery, causing variable results. Solids can build up at the aqueous-organic inerface in separators and cause flooding and unacceptably high solvent losses. Calcining of the phosphate rock before digestion in sulfuric acid is mentioned as a solution to the problem. Another solution mentioned is to age the acid to allow the organic matter to separate upon standing. However, such expedients do nothing to decrease the concentration of ionic metallic impurities in wet process phosphoric acid.

In the recent past, solvent extraction techniques for the removal of ionic metallic impurities from wet process phosphoric acid (in contrast with earlier processes for the extraction of pure phosphoric acid from impure acid) have been described. The extraction of ionic metallic impurities is disclosed to be for the purpose of purifying the wet process phosphoric acid before conversion of the acid to superphosphoric acid. The solvent extraction patents cited below do not describe the solvent extraction of uranium treated for removal of ionic metallic impurities.

Such a solvent extraction process has been described by Wiliams et al in U.S. Pat. No. 3,694,153 (hereinafter referred to as Williams) for the purification of wet process phosphoric acid. Using liquid water immiscible organic sulfonic acids dissolved in organic solvents, Williams was able to remove ionic metallic impurities from the phosphoric acid. Williams also described further treatment of phosphoric acid following the sulfonic acid treatment by contact with a water immiscible primary amine-solvent system for removing organic colorants and iron, aluminum, silicon, fluoride, and sulfate ions. The entire disclosure of U.S. Pat. No. 3,694,153 is incorporated herein by this reference.

Copending U.S. patent application Ser. No. 688,265, filed May 20, 1976, by Fernando Ore' and James L. Bradford, and assigned to the assignee of the present application, (now U.S. Pat. No. 4,053,564) is incorporated herein in its entirety by this reference. Said application Ser. No. 688,265 describes a solvent extraction process for the purification of phosphoric acid, particularly wet process phosphoric acid, using combinations of water immiscible organic sulfonic acids and water immiscible organic acid phosphates dissolved in a water immiscible organic solvent.

An embodiment of the process described in said U.S. patent application Ser. No. 688,265, now U.S. Pat. No. 4,053,564, employing dinonylnaphthalene sulfonic acid and di(2-ethylhexyl) phosphoric acid, was first practiced in a commercial scale plant on May 30, 1975. In *Chemical & Engineering News*, Sept. 1, 1975, page 22, it was reported that Fernando Ore' and James L. Bradford described a solvent extraction process for purifying phosphoric acid using "an aliphatic-substituted aromatic sulfonate as the active exchange agent and an alkyl phosphate ester as phase-modifier, dissolved in a kerosene-type diluent", and that "the first commercial application of the . . . process is now in limited commercial operation at a phosphoric acid plant in northern Florida."

The processes of U.S. Pat. No. 3,694,153, and said U.S. patent application Ser. No. 688,265 are directed to the removal of ionic metallic impurities, notably $Ca^{+2}$, $Mg^{+2}$, $Al^{+3}$, and $Fe^{+2,+3}$ from wet process phosphoric acid. Phosphoric acid purified in accordance with these processes is disclosed to be useful in the manufacture of superphosphoric acid.

SUMMARY

It has now been found that the recovery of uranium from wet process phosphoric acid by solvent extraction with organophosphorus compounds is facilitated when the wet process phosphoric acid is first contacted with a water immiscible organic sulfonic acid dissolved in a water immiscible organic diluent, preferably in combination with a water immiscible organic acid phosphate compound. In accordance with this invention, impure aqueous, phosphoric acid containing uranium values is contacted with a water immiscible organic extractant comprising a water immiscible organic sulfonic acid to form a pretreated phosphoric acid containing uranium values. The organic extractant removes ionic metallic impurities and organic impurities from the phosphoric acid, but does not remove substantial quantities of uranium values from the phosphoric acid.

The pretreated phosphoric acid is then contacted with a second water immiscible organic extractant comprising an organophosphorous uranium-extracting agent. Uranium-enriched second organic extractant is processed for recovery of uranium values contained therein.

BRIEF DESCRIPTION OF THE DRAWINGS

FIG. 2 illustrates what proportions of the uranium in phosphate matrix end up in the phosphoric acid product, in the slime and slime acids, and in the filter cake obtained in the well known dihydrate or gypsum process; and FIG. 3 illustrates what proportions of the uranium in phosphate matrix end up in the phosphoric acid product, in the slimes and slime acids, and the filter cake obtained in a hemihydrate process, for example, the hemihydrate processes described in U.S. patent application Ser. Nos. 703,139 and 703,208 (now U.S. Pat. No. 4,132,760), filed July 7, 1976, the entire disclosures of which are incorporated herein by this reference.

DETAILED DESCRIPTION

THE PRETREATMENT SEQUENCE

Figure 1:
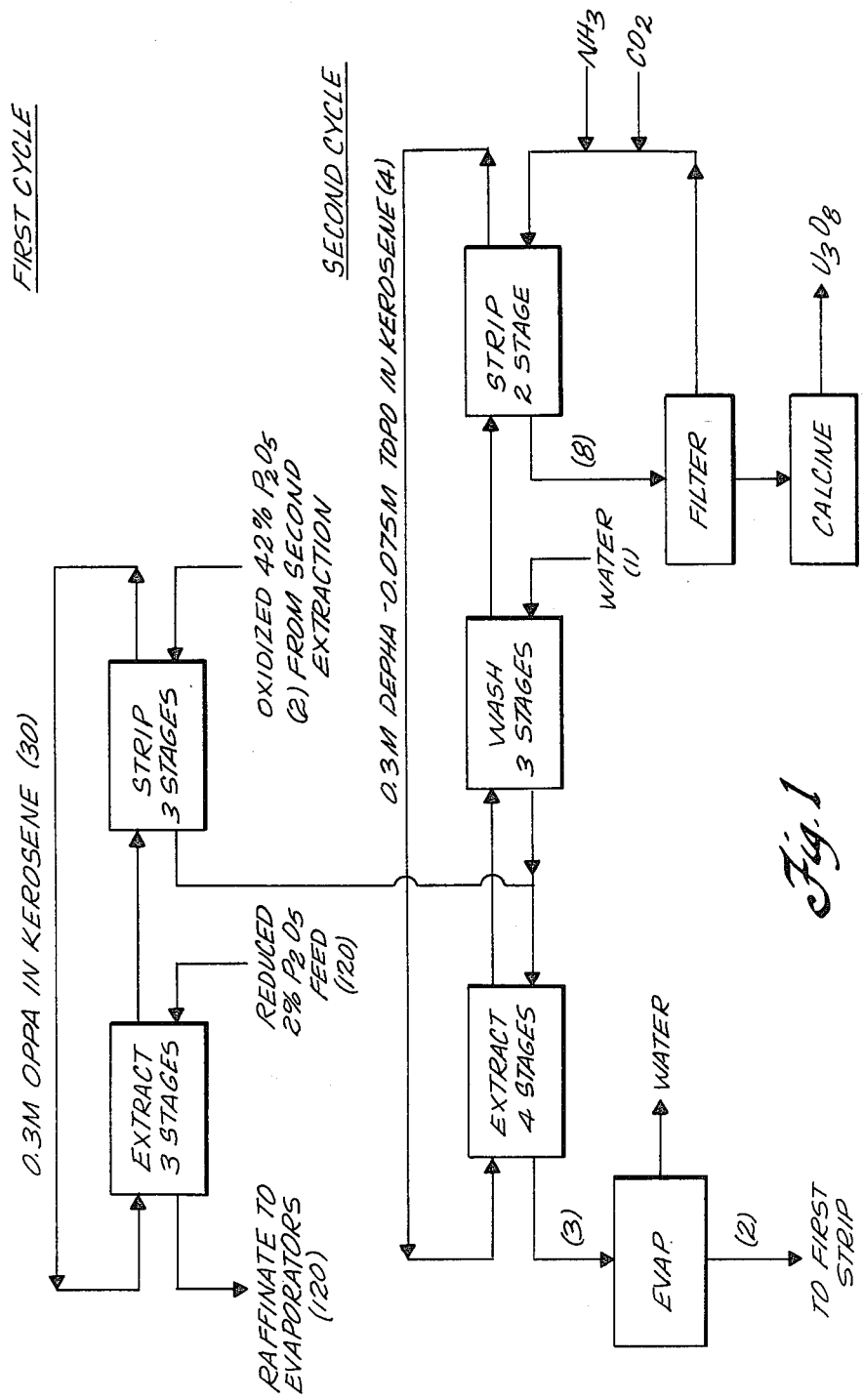
FIG. 1 illustrates a block flow diagram of a uranium extraction process useful in the practice of this invention.

An impure aqueous phosphoric acid phase containing uranium values, organic impurities, and ionic metallic impurities selected from the group consisting of calcium, magnesium, aluminum and iron (II) and (III), is pretreated by thoroughly mixing said aqueous phosphoric acid phase with an organic extractant phase which contains at least one water immiscible organic sulfonic acid dissolved in a water immiscible organic solvent. Preferably, the organic extractant phase also contains at least one water immiscible organic acid phosphate compound. The organic extractant phase extracts ionic metallic impurities and organic impurities therefrom. After mixing, the aqueous phosphoric acid phase is separated from the loaded organic extractant phase which contains ionic metallic impurities selected from the group consisting of calcium, magnesium, aluminum, and iron (II) and (III) and $P_2O_5$ values and organic impurities to yield pretreated phosphoric acid.

An aqueous phosphoric acid phase containing from 1% $P_2O_5$ to 55% $P_2O_5$ by weight and also containing ionic metallic impurities such as calcium, magnesium, aluminum and iron (II) and (III) can be used in the present invention. This can be wet process phosphoric acid made by the dihydrate, the hemihydrate or the anhydrite process. It can be a dilute (1% to 5% $P_2O_5$ by weight) phosphoric acid solution produced by the acidulation of $P_2O_5$ values in slimes produced in the benefication of phosphate rock. Waste phosphoric acid solutions containing uranium values, metallic impurities such as chromium, zinc, nickel, and the like can also be utilized in the present invention. It is preferable to use an aqueous phosphoric acid prepared by a wet process method.

Wet process phosphoric acids that can be treated beneficially in accordance with this invention can be obtained from the well known dihydrate or gypsum processes, such as the Prayon process, and the hemihydrate processes, especially those described in U.S. patent applications Ser. Nos. 703,139 and 703,208 (now U.S. Pat. No. 4,132,760), both filed July 7, 1976, the entire disclosures of which are incorporated herein by this reference. In the latter hemihydrate processes, sulfuric acid is added to a solution of phosphate rock in phosphoric acid to precipitate calcium sulfate hemihydrate, and a filter cake (the hemi cake) is obtained which contains calcium sulfate hemihydrate and a higher proportion of the uranium values extracted from the phosphate rock than does the wet process phosphoric acid which is the filtrate. See, for example, FIG. 3. Accordingly, the filter cake can be slurried in aqueous medium containing sufficient sulfuric acid to recover $P_2O_5$ values, cause recrystalization to gypsum, and produce an impure wet process phosphoric acid containing a high proportion of uranium and usually at least about 2 percent sulfuric acid. This impure phosphoric acid can be treated for recovery of uranium in accordance with the present invention. Similarly, wet process phosphoric acid obtained by treatment of slimes can be beneficially treated in accordance with this invention.

FIGS. 2 and 3 trace the distribution of uranium values in the various liquid acids and residues produced in dihydrate processes and the hemihydrate processes. The liquid acids can be treated in accordance with this invention. The residues can be slurried in aqueous medium for extraction of $P_2O_5$ values and uranium values to produce a wet process phosphoric acid that can be treated in accordance with this invention.

Phosphoric acid that can be treated beneficially in accordance with this invention for recovery of uranium is that produced from high alumina pebble as described in U.S. patent application Ser. No. 676,559, filed Apr. 13, 1976, the entire disclosure of which is incorporated herein by this reference.

The organic extractant phase consists of at least one water immiscible organic sulfonic acid and at least one water immiscible organic solvent.

Water immiscible organic sulfonic acids employed in accordance with the practice of this invention include aryl-, alkylaryl-, polyalkylaryl-, alkanoylaryl-, and polyalkanoylaryl-sulfonic acids.

An especially preferred group of sulfonic acids for the present invention are the substituted sulfonic acids of formulae I and II

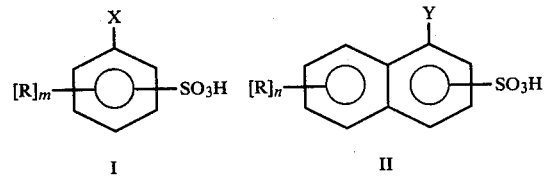

wherein formula I, R is an alkyl group of from 5 to 25 carbon atoms or an alkanoyl group of 8 to 18 carbons, $[R]_m$ contains at least 8 carbon atoms when m is 1 and $[R]_m$ contains at least 10 carbon atoms when m is 2 and further provided that m can be 1 or 2 when R is alkyl and m can be 1 when R is alkanoyl; wherein in Formula II, R is an alkyl group of from 5 to 25 carbon atoms or an alkanoyl group of from 5 to 18 carbon atoms, $[R]_n$ contains at least 8 carbon atoms when n is 1, $[R]_n$ contains at least 10 carbon atoms when n is 2 and $[R]_n$ contains at least 15 carbon atoms when n is 3, further provided that n can be 1, 2, or 3 when R is alkyl and n can be 1 or 2 when R is alkanoyl; X is hydrogen, hydroxy, fluoro, chloro, bromo, iodo, methoxy, ethoxy, propoxy, -carboxymethoxy or -carboxyethoxy; provided, however, that Y is in the alpha position with respect to the —SO$_3$H group and further provided that the —SO$_3$H group is at position 1 or 2 on the napthalene molecule.

The R alkyl or alkanoyl groups can be in any position on the benzene or napthalene rings and can be on one or both of the napthalene rings. The R alkyl groups can be straight chain or branched chain groups, preferably branched chain groups.

These compounds are made by known chemical processes, for example; the Friedel-Crafts reaction is used to alkylate the phenol or naphthalene and the Williamson-type ether synthesis is used when an ether linkage is introduced into the molecule.

The water immiscible organic sulfonic acids contain at least 12 carbon atoms and preferably about 14 to about 30. An especially preferred group of water immiscible organic sulfonic acids for the present process are dinonylnaphthalene sulfonic acid, 5-dodecanoyl-2-chlorobenzenesulfonic acid, 5-nonyl-2-ethoxybenzensulfonic acid, 3,5-di-t-octyl-2-(alphacarboxymethoxy)-benzenesulfonic acid and 3,5-di-t-octyl-hydroxybenzenesulfonic acid.

Water immiscible organic acid phosphate compounds constitute another component of organic extractant phase employed in the present process. "Organic acid phosphate" is the generic name given to mixtures of mono- and di-organo substituted phosphoric acid compounds corresponding to (RO) PO$_3$H$_2$ and (RO)$_2$PO$_2$H respectively. Pure organic acid phosphates, either mono- or di-substituted, can also be used. The materials which can be used in this process are mixtures of 0.1% to 60.0% by weight monosubstituted and about 99% to about 35% by weight disubstituted organic acid phosphates which can contain about 0.1% to about 1.0% of the alcohol corresponding to the organic substituent, about 0.1% to about 5.0% triorgano-phosphates and about 0.1% to about 3.0% phosphoric acid and condensed phosphates. A description of organic acid phosphates that are available are described in the Product Information Bulletin of Mobil Chemical Corp. titled "Organic Acid Phosphates" 6 pages, no date of publication, and Technical Data Sheet No. 707 of Hooker Chemical Corp. titled "Alkyl Acid Phosphates" December 1961 and Union Carbide Corp. Product Information Bulletin F42118, "Di(2-ethylhexyl) Phosphoric Acid". Synthesis conditions and purification procedures can alter the ratio of the monosubstituted to the disubstituted derivatives as described in "Phosphorous And Its Compounds" Vol. II, John R. Van Wazer, editor, Interscience Publishers Inc. 1961. Purification of said mixtures results in organic acid phosphates containing 95%+ of the monosubstituted or the disubstituted derivative.

The formula of the organic acid phosphates employed in accordance with the practice of the present process are shown below as formula III and IV

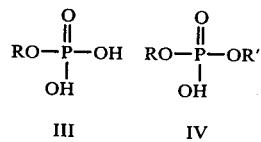

wherein R and/or R' can be alkyl, alkenyl, alicyclic, aryl, alkenylaryl, alkylaryl, alicyclicaryl or heterocyclic groups. The organic substituent groups, that is the R or R' groups, may contain halo-, hydroxy, and alkoxy-groups. The substituent groups R and R' should contain at least 4 carbon atoms and more preferably from 8 to about 18 carbon atoms. R can be the same as or different from R'; preferably R is the same as R'.

Illustrative but nowise limiting are the following examples of organic acid phosphates: 1-(6-hydroxyhexyl) acid phosphate, amyl acid phosphate, isooctyl acid phosphate, 2-ethylhexyl acid phosphate, decyl acid phosphate, lauryl acid phosphate, stearyl acid phosphate, phenyl acid phosphate and octylphenyl acid phosphate, cyclohexyl acid phosphate, cyclohexyl phenyl acid phosphate, 1-(5-hexynyl) acid phosphate, 1-(5-hexenyl) phenyl acid phosphate, 1-(6-chlorohexyl) acid phosphate, and 1-(6-methoxyhexyl) acid phosphate. When aryl-, alkylaryl or alicyclicaryl-acid phosphates are employed, the aromatic ring can be substituted with a hydroxy, an alkoxy or a halo group.

Water immiscible organic phosphonates can also be used in this invention. The half-ester can be used. The formula of the phosphonates is R-P(O) (OH) (OR') in which R and/or R' can be alkyl, alkenyl, alicyclic, aryl, alkenylaryl, alkylaryl, alicyclicaryl or heterocyclic. The organic substituent groups, R and R', may be substituted with an alkoxy, a hydroxy or a halo group; said R groups may be the same or different. R and/or R' should contain from 4 to about 18 carbon atoms.

The water immiscible organic sulfonic acid and the water immiscible organic acid phosphate can be dissolved in water immiscible organic solvents. The preferred solvents are saturated hydrocarbons having a boiling point between 120° C. and 230° C., flash points between 15° C. and 80° C. and densities lower than the density of the phosphoric acid. Either pure hydrocarbons or mixtures of hydrocarbons may be used.

Illustrative, but nowise limiting, of the water immiscible organic solvent for the water immiscible organic sulfonic acids and the water immiscible organic acid phosphates employed in the present process are keosene, mineral spirits, benezene, naphtha, xylene, toluene, nitrobenzene, carbon tetrachloride, chloroform, methylene chloride, trichloroethylene, isooctane, heptane and the like.

The water immiscible organic sulfonic acid can be dissolved in the water immiscible organic solvent in concentrations of about 0.05 molar to about 3.0 molar or more of the water immiscible organic sulfonic acid. The preferred concentration range of the water immiscible organic sulfonic acid in the water immiscible organic solvent is from about 0.2 molar to about 0.5 molar.

The water immiscible organic acid phosphate can be dissolved in the water immiscible organic solvent in concentrations of 0.05 molar to about 1.0 molar or more of the water immiscible organic acid phosphate. The preferred concentration is about 0.15 molar to about 0.65 molar of the water immiscible organic acid phosphate.

An aqueous phosphoric acid phase containing from about 1% to about 55% $P_2O_5$ by weight and additionally containing ionic metallic impurities selected from the group consisting of calcium, magnesium, aluminum and iron (II) and (III) is thoroughly mixed with an organic extractant phase. The organic extractant phase contains at least one water immiscible organic sulfonic acid and at least one water immiscible organic acid phosphate dissolved in a water immiscible organic solvent.

The temperature of the aqueous phosphoric acid phase can be from about 20° C. to about 77° C.; preferably from about 55° C. to about 70° C. The organic extractant phase can be from about 20° C. to about 60° C.; preferably from about 50° C. to about 58° C.

The aqueous phosphoric acid phase at a temperature of from about 55° C. to about 70° C. is thoroughly mixed with the organic extractant phase maintained at a temperature of from about 50° C. to about 58° C., the temperature of the resulting mixture is about 50° C. to about 65° C. The volume ratio of the organic extractant phase to the aqueous phosphoric acid phase is from 1 to 1 to about 50 to 1; preferably from about 2 to 1 to about 12 to 1 and most preferably from about 3 to 1 to about 7 to 1.

The vigorously mixed organic extractant phase and the aqueous phosphoric acid phase are allowed to settle. Separation of the two phases is effected due to the immiscibility of the two phases and the differences in the specific gravities of the phases.

The two discrete phases can be separated one from another by decanting, pumping, gravity flow or the like.

The aqueous phosphoric acid phase can be contacted with an organic extractant phase in 1 to 20 or more extraction stages. It has been found that about three extraction stages yield satisfactory results, although more or fewer stages may also be used.

The separated phosphoric acid can now be used as feed to the uranium extraction sequence.

The separated organic extractant phase (referred to as the loaded organic extractant phase) contains ionic metallic impurities extracted from the aqueous phosphoric acid phase as well as co-extracted $P_2O_5$ values.

The P$_2$O$_5$ values can range from about 3% to about 20% of the P$_2$O$_5$ initially present in the aqueous phosphoric acid phase. The separated organic extractant can be regenerated for reuse in accordance with procedures involving water washes and contact with mineral acids as described in said U.S. patent application Ser. No. 688,265 (now U.S. Pat. No. 4,053,564), and in U.S. patent application Ser. No. 676,522 (now U.S. Pat. No. 4,082,836), filed Apr. 13, 1976, the entire disclosure of which is incorporated herein by this reference. Such regeneration procedure can contribute to economical practice of the present invention.

THE URANIUM EXTRACTION SEQUENCE

It is believed that pretrreatment of wet process phosphoric acid as described above is particularly efficacious (compared with other pretreatment processes) in facilitating the extraction of uranium values from such acid with the use of organophosphorus extracting agents for uranium. Organophosphorus extracting agents for uranium include mono- and diesters of orthophosphoric acid and pyrophosphoric acid as disclosed in U.S. Pat. No. 2,835,552; di(2-ethylhexyl) phosphoric acid (with the synergistic additive trioctylphosphine oxide oxide) as disclosed in U.S. Pat. No. 3,711,591; dialkylphosphoric acid and trialkylphosphine oxides as disclosed in U.S. Pat. No. 3,737,513; and mono- and dialkylphenyl esters of orthophosphoric acid as disclosed in U.S. Pat. No. 3,835,214. Pretreatment of phosphoric acid as described above also improves the purity of the phosphoric acid for concentration to superphosphoric acid after extraction of uranium values therefrom. Thus, wet process phosphoric acid pretreatment in accordance with this invention provides an improved phosphoric acid feed both for extraction of uranium and for concentration to superphosphoric acid after extraction of uranium.

A surprising feature of the present invention is that pretreatment of phosphoric acid containing uranium values with an organic sulfonic acid and an organic acid phosphate removes ionic metallic impurities such as Ca$^{+2}$ and Mg$^{+2}$ and organic impurities, but does not remove substantial quantities of uranium values. Thus, the uranium values in the pretreated phosphoric acid remain available for extraction with the use of organophosphorus extracting agents such as those mentioned above. It is indeed surprising that impurities can be selectively removed from phosphoric acid containing uranium values with the use of an organophosphorus compound, namely, an organic acid phosphate, while leaving most or all of the uranium values in the acid for subsequent extraction with organophosphorus compounds that such as organic acid phosphates.

Other pretreatments of wet process phosphoric acid before extraction of uranium with organic extractants can include oxidation of the organic matter in the acid, flocculation or coagulation, kerosene wash, and contact with activated carbon.

In accordance with the present invention, phosphoric acid containing uranium values is pretreated with an organic sulfonic acid, preferably in combination with an organic acid phosphate, as described above. Pretreated phosphoric acid is then contacted with a water immiscible organic extractant comprising a uranium extracting organophosphorus compound. Uranium extracting organophosphorus compounds include monoesters, diesters, and triesters of orthophosphoric acid or pyrophosphoric acid and alkyl monohydric alcohols having 4 to 20 carbons such as n-butyl, isobutyl, n-hexyl, n-heptyl, n-octyl, isooctyl, 2-ethylhexyl, n-nonyl, n-decyl, n-dodenyl, cetyl, and 2, 6, 8-trimethyl-4-nonyl alcohols and the like. Uranium extracting organophosphorus compounds also include monoesters and diesters of orthophosphoric acid and alkylphenols having 8 to 20 carbons, such as ethylphenols, n-propylphenols, n-butylphenols, iosbutylphenols, n-hexylphenols, n-octylphenols, isooctylphenols, 2-ethylhexylphenols, n-decylphenols, n-dodecylphenols, isododecylphenols, and the like. Such phenols are usually available as mixtures or ortho, meta, and para isomers.

In addition to the described esters of phosphoric acid, alkyl phosphonic acids and alkylphosphinic acids such as di(2-ethylhexyl) phosphonic acid and di(2-ethylhexyl) phosphinic acid are useful uranium extracting agents.

Neutral alkyl phosphine oxides, phosphinates, and phosphonates can be employed as synergistic additives in combination with the alkyl and alkylaryl phosphoric acids, phosphonic acids, and phosphinic acids in the solvent extraction of uranium. Examples of such compounds include tributylphosphine oxide, tri-n-octylphosphine oxide, butyl dibutyl phosphinate, butyl dihexyl phosphinate, dibutyl butylphosphonate, and dihexyl hexylphosphonate.

A preferred organophosphorus uranium extracting agent is a mixture of mono 2-ethylhexylphosphoric acid and di(2-ethylhexyl) phosphoric acid. The mixture is commonly referred to as OPPA. Preferably, the ratio of di to mono is from about 1 to 1 to about 8 to 1, more preferably from about 1 to 1 to about 2 to 1.

Another preferred organophosphorus uranium-extracting agent is a mixture of di(2-ethylhexyl) phosphoric acid (D2EHPA) and trioctylphosphine oxide (TOPO) in a mole ratio of from about 10 to 1 to about 1 to 10. Preferably, the mole ratio of D2EHPA to TOPO is from about 1 to 1 to about 8 to 1, e.g. about 4 to 1.

In order to lower the viscosity of the uranium-extracting agents and aid in phase separation, the agents are usually employed in solution in a water immiscible inert aliphatic organic diluent, such as paraffin oil, mineral spirits, or kerosene. It is preferred to employ an aliphatic diluent having a minor content of aromatics, for example, from about 3 to about 15 weight percent, preferably 5 to 10 weight percent, to avoid precipitation of complexes formed between the organophosphorus extracting agents and iron present as impurity in wet process phosphoric acid, particularly iron-OPPA complexes.

Although any of the known processes for solvent extraction of uranium from phosphoric acid described in the above-cited patents can be employed in the practice of this invention, the invention will, for illustrative purposes, be described in detail with reference to a preferred two cycle extraction process employing OPPA in the first cycle and D2EHPA/TOPO in the second cycle.

FIRST CYCLE

Wet process phosphoric acid of any concentration that has been pretreated in accordance with this invention can be used as feed to the uranium extraction sequence. Referring now to FIG. 1, wet process phosphoric acid that has been pretreated is contacted with elemental iron (step not shown) to reduce substantially all of the uranium present in the acid to the uranous form, $U^{IV}$. Iron dissolves in the acid as ferrous ion, which then reduces uranic, $U_{VI}$, uranium present in the acid and becomes oxidized to ferric ion. The acid is thus contacted with elemental iron, usually scrap iron, until sufficient ferrous ion has entered the acid to reduce the uranium. The acid is contacted with the iron until the oxidation potential of the acid, as measured against a standard calomel electrode, is below about $+200$ millivolts, preferably below about $+100$ millivolts.

The reduced acid feed, having a $P_2O_5$ content of 28 weight percent in this illustrative embodiment, is fed to the EXTRACT step of the first cycle. The temperature can be from about 10° C. to about 80° C., preferably from about 40° C. to about 60° C. In the extraction step, the feed acid is thoroughly mixed with a water immiscible solution of 0.3 molar OPPA in kerosene in a 3 stage countercurrent mixer settler-unit. The concentration of OPPA can be from about 0.1 to about 1.0 molar or more. In each stage, acid and extractant are mixed and allowed to settle. Uranium values are extracted from the aqueous acid phase into the organic extractant phase. In countercurrent extraction, as is well known, fresh acid feed is contacted in the first stage with extractant that has already been contacted with partially extracted acid in the second and third stages. In the third stage, twice extracted acid is contacted with fresh extractant. Uranium-depleted acid, the raffinate, is withdrawn from the third stage for further concentration in evaporators for production of SPA, or for other uses.

In FIG. 1, the numbers in parenthesis indicate the relative flow volumes of the various streams. In the illustration, the ratio of acid feed to extractant in the first cycle is 4 to 1. The ratio of course can vary widely, depending upon temperature, the concentration of acid, and the uranium content of the acid, and the concentration of extracting agent in the extractant. The ratio of feed to extractant can be from 1 to 1 to 100 to 1, typically from 2 to 1 to 10 to 1.

In the STRIP block of the first cycle, uranium-laden extractant is contacted in a 3 stage countercurrent mixer-settler with phosphoric acid containing an oxidizing agent for uranium. The phosphoric acid can be furnace acid and acid from the gypsum processes. It has also been found that hemihydrate acid as prepared in accordance with said U.S. patent applications Ser. Nos. 703,139 and 703,208 (now U.S. Pat. No. 4,132,760) is a superior acid for use in the stripping step. Uranium in the extractant is in reduced form. The extractant has less affinity for uranium in oxidized form. Thus, uranium is oxidized and stripped from the organic extractant into the aqueous stripping solution. The stripping solution usually has a higher $P_2O_5$ content than the feed acid to provide greater concentration of uranium values. The flow volume of the stripping solution is preferably smaller than that of the organic extractant to concentrate uranium values. The ratio of extractant to stripping solution can be from about 100 to 1 to about 1 to 1, preferably from about 25 to 1 to about 10 to 1. Stripped extractant is recycled to the EXTRACT block.

Useful oxidizing agents include sodium chlorate, sodium persulfate, oxygen, ozone, and ammonium persulfate. Ammonium persulfate is preferred.

Stripping solution containing oxidized uranium, $U^{VI}$, flows to the second extraction cycle.

THE SECOND CYCLE

In the second cycle, uranium-rich stripping solution is contacted with a water immiscible solution of 0.3 molar D2EHPA and 0.075 molar TOPO in kerosene in a 4 stage counter-current mixer-settler. In place of D2EHPA, an organic acid phosphate as represented by Formulae III and IV can be used. The flow ratio of D2EHPA-TOPO to oxidative stripping solution can be from about 25 to 1 to about 1 to 1. The ratio is preferably greater than 1 to 1, e.g., at least about 2 to 1, because D2EHPA-TOPO is a less powerful extracting agent than OPPA. Uranium depleted oxidative stripping solution is concentrated and recycled to the STRIP block of the first cycle.

The D2EHPA-TOPO extractant containing uranium values in the oxidized form is washed with water in a 3 stage countercurrent mixer-settler for extracting of $P_2O_5$ values. The used wash water is sent to the EXTRACT block of the second cycle along with the oxidative stripping solution. To reduce the demand on the evaporators, the ratio of wash water to extractant is kept low, for example from about 1 to 1 to about 1 to 10.

The washed D2EHPA-TOPO extractant then flows to the STRIP block, where it is contacted in a 2 stage counter-current mixer-settler with a solution of ammonium carbonate made by bubbling ammonia and carbon dioxide directly into the solution. The concentration of ammonium carbonate can vary from about 0.1 molar to saturation, preferably higher than 1 molar, e.g. about 2 molar. At the preferred higher concentrations of ammonium carbonate, uranium values are stripped from the D2EHPA-TOPO extractant and precipitate in the aqueous ammonium carbonate solution as ammonium uranyl tricarbonate in an easily filterable slurry. The flow volume ratio of ammonium carbonate to D2EHPA-TOPO extractant can be in the range of from about 1 to 1 to about 25 to 1, preferably from about 5 to 1 to about 10 to one.

The slurry of ammonium uranyl tricarbonate is filtered. The filtrate is recycled to the STRIP block, additional $NH_3$ and $CO_2$ being added to maintain the desired concentration of ammonium carbonate.

The filtered ammonium uranyl tricarbonate is then washed with water, dried, and calcined to liberate $NH_3$ and $CO_2$, which can be recovered and reused, and $U_3O_8$, a form of uranium that is highly desirable for further processing to nuclear fuel and the like.

The following example will help to illustrate practice of this invention.

EXAMPLE I

Samples of crude wet process phosphoric acid having a $P_2O_5$ analysis of 28 weight percent were contacted with iron nails for various times to reduce uranium values to $U^{IV}$. The reduced samples were then extracted with 0.3 molar OPPA in kerosene at 40° C., the volume ratio of extractant to acid being 1 to 2 Weight percent extractions of uranium and iron were measured, and separation factors calculated. The separation factor is the ratio of the distribution coefficient of iron. The distribution coefficient is the ratio of the concentration of a species in the organic phase to the concentration of that species in the aqueous phase after extraction. A high separation factor is desirable to minimize the iron content of the $U_3O_8$ product.

Samples of the same crude acid were pretreated by contacting them with a solution of about 17 to 20 weight percent dinonylnaphthalene sulfonic acid and 4 to 6 weight percent di(2-ethylhexyl) phosphoric acid in kerosene in a volume ratio of 4 to 1 at 55° C. The pretreated samples were contacted with iron nails and extracted as described above. The results are reported in the Table.

TABLE

EXTRACTION DATA FOR CRUDE AND REFINED 28% $P_2O_5$ VS. 0.3 M OPPA AT O/A = ½, 40° C.

| REDUCTION TIME | EMF, MV | EXTRACTION, % U | Fe | SEPARATION FACTOR |
|---|---|---|---|---|
| CRUDE ACID | | | | |
| 0 | 455 | 0 | 23 | 0 |
| 15 MIN. | 97 | 91 | 15 | 56 |
| 30 MIN. | — | 93 | 7 | 192 |
| PRETREATED ACID | | | | |
| 0 | 485 | 0 | 33 | 0 |
| 15 MIN. | 70 | 97 | 10 | 257 |
| 30 MIN. | −33 | 97 | 5 | 609 |

This extraction step corresponds to the first cycle of the preferred uranium extraction sequence and is critical to the efficient operation of the entire uranium recovery process, because it is in the first extraction that the uranium is removed from the acid and enters the recovery sequence. The efficiency of the first extraction limits the success of the whole. Thus, this simple experiment is a reliable indicator of the benefits to be derived in practice of this invention.

First, it can be seen that pretreated acid is reduced to a lower EMF (oxidation potential) more quickly than crude acid. This is beneficial because the longer the acid remains in contact with elemental iron, the higher the iron content of the acid becomes. This higher iron content then carries through the whole sequence and results in a high iron content in the $U_3O_8$ product, as well as in the uranium-depleted phosphoric acid product.

Second, the percent extraction of uranium is significantly higher from pretreated acid than from crude acid, a desirable effect that needs no comment.

Third, the percent of iron extracted is somewhat lower for pretreated acid than for crude acid. The combined effect of higher uranium extraction and lower iron extraction is clear in the much higher separation factors for pretreated acid, which are 3 to 4½ times the separation factors for crude acid.

The following examples illustrate another method for contacting pretreated phosphoric acid with organic extractant in accordance with this invention. These examples were obtain from a coworker, Robert D. Stewart, and also illustrate an independent invention of Robert D. Stewart, on the use of solids stabilized emulsions for liquid membrane solvent extraction, which is the subject of later-filed U.S. patent application Ser. No. 948,618, filed Oct. 4, 1978 and assigned to the assignee of the present application.

EXAMPLE 2

In this example, uranium was extracted from commercial fertilizer-grade phosphoric acid by a solid stabilized emulsion containing D2EHPA-TOPO as the extractant. The acid had been pretreated with a solution of dinonylnaphthalene sulfonic acid and di(2-ethylhexyl) phosphoric acid. The organic phase of the emulsion consisted of 20 ml of a solution which contained 266.4 g/l D2EHPA and 76 g/l TOPO dissolved in Union Neutral 300 oil. The internal aqueous phase was a solution of 50 g/l ferrous sulfate heptahydrate in 10 M reagent grade phosphoric acid.

A 0.2 g quantity of fumed silica was dispersed in 20 ml of the organic phase and then 20 ml of the aqueous phase was added with rapid stirring to form a stable water-in-oil type of emulsion. The emulsion was dispersed into 300 ml of fertilizer grade phosphoric acid at a temperature of 60° C. to which had been added 0.2 g $NaClO_3$. The phosphoric acid initially contained 57 mg/l of uranium.

After 60 minutes, the emulsion was separated from the bulk phase, which was now found to contain 17 mg/l uranium, showing that 70% of the uranium had been extracted from the acid. The internal aqueous phase was found to contain 300 mg/l of uranium, a concentration 5.3 times that initially present in the bulk phase.

EXAMPLE 3

This example was identical to Example 2, except that that bulk aqueous contained 0.2 g of ammonium persulfate instead of sodium chlorate and the extraction was carried out at 40° C. instead of 60° C. After contacting the emulsion with the bulk phase for 60 minutes, the concentration of uranium in the bulk phase had decreased to 42 mg/l from its initial value of 57 mg/l. It was thus demonstrated that 26% of the uranium had been extracted. Upon breaking the emulsion, 18 ml of internal aqueous phase was recovered which was found to contain 280 mg/l of uranium, thus demonstrating a concentration 4.9 times that initially present in the bulk phase.

Although this invention has been described with reference to particular details and embodiments thereof, the particulars are intended to illustrate rather than to limit the invention, the scope of which is defined in the following claims:

What is claimed is:

1. A process for recovering uranium values from phosphoric acid which comprises:
 (a) contacting an aqueous phosphoric acid phase containing uranium values, from 1% to about 55% $P_2O_5$ values by weight and impurities with a first water immiscible organic extractant phase comprising a water immiscible organic solvent containing at least one water immiscible organic sulfonic acid dissolved therein to form:
  (i) a pretreated phosphoric acid phase containing uranium values; and
  (ii) a loaded organic extractant phase containing impurities;
 (b) separating the pretreated aqueous phosphoric acid phase from the loaded organic extractant phase;
 (c) contacting pretreated aqueous phosphoric acid phase with a second water immiscible organic extractant phase comprising a water immiscible organic solvent containing at least one water immiscible organophosphorus uranium-extracting agent dissolved therein to form:
  (i) a uranium-depleted phosphoric acid phase; and
  (ii) an organic extractant phase containing uranium values;
 (d) separating the uranium-containing organic extractant phase from the uranium-depleted phosphoric acid phase; and
 (e) recovering uranium values from the uranium-containing second organic extractant phase.

2. The process according to claim 1 in which in step (a), the aqueous phosphoric acid phase is at a temperature of from about 20° C. to about 77° C. and the first organic extractant phase is at a temperature of from about 20° C. to about 60° C.; and wherein said phases are mixed in the volumetric ratio of the organic extractant phase to the aqueous phosphoric acid phase of from 1 to 1 to about 50 to 1.

3. The process according to claim 1 in which the water immiscible organic sulfonic acid is selected from the group consisting of alkylaryl, polyalkylaryl, alkanoylaryl, polyalkanoylaryl, and aromatic ring substituted sulfonic acid derivatives thereof represented by the formulae (I) and (II)

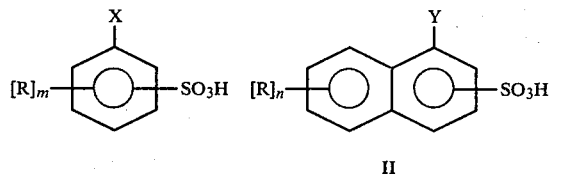

wherein in formula I R is an alkyl group of from 5 to 25 carbon atoms or an alkanoyl group of 8 to 18 carbons [R]$_m$ contains at least 8 carbon atoms when m is 1 and [R]$_m$ contains at least 10 carbon atoms when m is 2 and further provided that m can be 1 or 2 when R is alkyl and m can be 1 when R is alkanoyl; wherein in formula II R is an alkyl group of 5 to 25 carbon atoms or an alkanoyl group of from 5 to 18 carbon atoms, [R]$_n$ contains at least 8 carbon atoms when n is 1, [R]$_n$ contains at least 10 carbon atoms when n is 2 and [R]$_n$ contains at least 15 carbon atoms when n is 3, further provided that n can be 1, 2, 3 when R is alkyl and n can be 1 or 2 when R is alkanoyl; X is hydrogen, hydroxy, fluoro, chloro, bromo, iodo, methoxy, ethoxy, propoxy, carboxymethoxy, or carboxyethoxy; and Y is hydrogen, fluoro, chloro, bromo, iodo, methoxy, ethoxy, 2-propoxy, carboxymethoxy, or carboxyethoxy; provided however, that Y is in the alpha position with respect to the SO$_3$H group and further provided that the SO$_3$H group is at position 1 or 2 on the napthalene molecule.

4. The process according to claim 3 in which the water immiscible organic sulfonic acid is selected from the group consisting of 5-dodecanoyl-2-chlorobenzenesulfonic acid, 5-nonyl-2-ethoxy-benzenesulfonic acid, 3,5-di-t-octyl-2-(alphacarboxymethoxy)-benzenesulfonic acid and 3,5-di-t-octyl-2-hydroxybenzenesulfonic acid.

5. The process according to claim 1 which comprises reducing uranium values in the pretreated aqueous phosphoric acid phase to the U$^{IV}$ form before contacting the aqueous phase with the second organic extractant phase, and wherein the organophosphorus uranium-extracting agent comprises at least one alkylphenyl ester of orthophosphoric acid.

6. The process according to claim 5 in which uranium values are reduced by contacting the pretreated aqueous phosphoric acid phase with elemental iron.

7. The process according to claim 5 in which the organophosphorus agent comprises a mixture of octylphenylphosphoric acid and di(octylphenyl) phosphoric acid.

8. The process according to claim 1 in which uranium values in the pretreated aqueous phosphoric acid phase are oxidized to the U$^{VI}$ form before contacting the aqueous phase with the second organic extractant phase and wherein the organophosphorus uranium-extracting agent is selected from the group consisting of alkyl esters of orthophosphoric acid, alkyl esters of pyrophosphoric acid, alkyl phosphonic acids, alkyl phosphinic acids, and mixtures thereof.

9. The process according to claim 8 in which the organophosphorus uranium-extracting agent comprises a dialkyl ester of orthophosphoric acid.

10. The process according to claim 9 in which the dialkyl ester of orthophosphoric acid comprises di(2-ethylhexyl) phosphoric acid.

11. The process according to claim 1 wherein uranium values are recovered from the uranium containing second organic extractant phase by the steps of:
contacting second organic extractant phase containing uranium values with a first aqueous stripping phase containing an oxidizing agent for uranium values to form:
  (i) an enriched aqueous stripping phase containing uranium values in U$^{VI}$ form, and
  (ii) a uranium-depleted organic phase;
separating the enriched aqueous stripping phase from the uranium-depleted organic phase;
contacting the enriched aqueous stripping phase with a third water immiscible organic extractant phase comprising a water immiscible organic diluent and at least one water immiscible organophosphorus uranium-extracting agent dissolved therein to form:
  (i) a uranium-depleted first aqueous stripping phase, and
  (ii) a uranium-enriched third organic extractant phase;
separating uranium-enriched third organic extractant phase from uranium-depleted first aqueous stripping phase;
contacting uranium-enriched third organic extractant phase with a second aqueous stripping phase containing ammonium carbonate to form:
  (i) a uranium-depleted third organic extractant phase, and
  (ii) a slurry of solid ammonium uranyl tricarbonate in second aqueous stripping phase;
separating the slurry of solid ammonium uranyl tricarbonate from the uranium-depleted third organic extractant phase;
separating solid ammonium uranyl tricarbonate from the slurry; and
drying and calcining the ammonium uranyl tricarbonate to form U$_3$O$_8$.

12. The process according to claim 1 wherein the aqueous phosphoric acid which is contacted in step (a) is obtained by conversion in dilute aqueous sulfuric acid of calcium sulfate hemihydrate containing P$_2$O$_5$ values to calcium sulfate dihydrate and a solution of impure phosphoric acid, said calcium sulfate hemihydrate being obtained by adding sulfuric acid to a solution of phosphate rock in phosphric acid to precipitate said calcium sulfate hemihydrate.

13. A process for recovering uranium values from phosphoric acid which comprises:
(a) contacting an aqueous phosphoric acid phase containing uranium values, from 1% to about 55% P$_2$O$_5$ values by weight, and impurities with a first water immiscible organic extractant phase comprising a water immiscible organic solvent containing at least one water immiscible organic sulfonic acid and at least one water immiscible organic acid phosphate, phosphonate, or half ester thereof dissolved therein to form:
  (i) a pretreated phosphoric acid phase containing uranium values; and (ii) a loaded organic extractant phase containing impurities;

(b) separating the pretreated aqueous phosphoric acid phase from the loaded organic extractant phase;

(c) contacting pretreated aqueous phosphoric acid phase with a second water immiscible organic extractant phase comprising a water immiscible organic solvent containing at least one water immiscible organophosphorus uranium-extracting agent dissolved therein to form:

(i) a uranium-depleted phosphoric acid phase; and (ii) an organic extractant phase containing uranium values;

(d) separating uranium-containing organic extractant phase from uranium-depleted phosphoric acid phase; and (e) recovering uranium values from uranium-containing organic extractant phase.

14. The process according to claim 13 in which the water immiscible organic acid phosphate compound is selected from the group consisting of monosubstituted organic acid phosphates, disubstituted organic acid phosphates, and mixtures thereof in which the substituent group contains from about 4 to about 18 carbon atoms and is selected from the group consisting of alkyl, alkenyl, alicyclic, aryl, alkylaryl, alkenylaryl, alicyclicaryl, heterocyclic and mixtures thereof.

15. The process according to claim 14 wherein the water immiscible organic acid phosphate compound is selected from the group consisting of amyl acid phosphate, isooctyl acid phosphate, decyl acid phosphate, lauryl acid phosphate, stearyl acid phosphate, phenyl acid phosphate, octylphenyl acid phosphate, cyclohexyl acid phosphate, cyclohexylphenyl acid phosphate, 1-(5-hexynyl) acid phosphate, 1-(5-hexynyl) phenyl acid phosphate, 1-(6-chlorohexyl) acid phosphate, 1-(6-hydroxyhexyl)acid phosphate, and 1-(6-methoxyhexyl) acid phosphate.

16. The process according to claim 13 in which in step (a), the aqueous phosphoric acid phase is at a temperature of from about 20° C. to about 77° C. and the first organic extractant phase is at a temperature of from about 20° C. to about 60° C.; and wherein said phases are mixed in the volumetric ratio of the organic extractant phase to the aqueous phosphoric acid phase of from 1:1 to about 50:1.

* * * * *